(12) United States Patent
Bhattacharjee et al.

(10) Patent No.: US 12,386,789 B1
(45) Date of Patent: Aug. 12, 2025

(54) FACILITATING ANALYTICS INVOLVING COLD DATA TIERED TO AN OBJECT STORE BY AN ON-PREMISES STORAGE SOLUTION BY CREATING A VIRTUAL STORAGE APPLIANCE ON THE OBJECT STORE

(71) Applicant: NetApp, Inc., San Jose, CA (US)

(72) Inventors: Mrinal K. Bhattacharjee, Bangalore (IN); Arindam Banerjee, Pleasanton, CA (US); Arjun Singh Kharai, Uttarakhand (IN); Dnyaneshwar Pawar, Bangalore (IN)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/644,908

(22) Filed: Apr. 24, 2024

(51) Int. Cl.
    *G06F 16/17* (2019.01)
    *G06F 16/178* (2019.01)
    *G06F 16/188* (2019.01)

(52) U.S. Cl.
    CPC .......... *G06F 16/178* (2019.01); *G06F 16/188* (2019.01)

(58) Field of Classification Search
    CPC ............................. G06F 16/178; G06F 16/188
    USPC ........................................................ 707/639
    See application file for complete search history.

(56) References Cited

U.S. PATENT DOCUMENTS

| | | | |
|---|---|---|---|
| 2015/0112951 A1* | 4/2015 | Narayanamurthy | G06F 16/172 707/694 |
| 2017/0199678 A1* | 7/2017 | Subramanian | G06F 3/0685 |
| 2018/0275907 A1* | 9/2018 | Subramanian | G06F 12/0253 |
| 2018/0373722 A1* | 12/2018 | Ulasen | G06N 3/045 |
| 2019/0347338 A1* | 11/2019 | Mani | G06F 16/178 |
| 2020/0372163 A1* | 11/2020 | Chung | G06F 21/6209 |
| 2023/0244635 A1* | 8/2023 | Dubeyko | G06F 16/122 707/634 |

\* cited by examiner

*Primary Examiner* — Hicham Skhoun
(74) *Attorney, Agent, or Firm* — Jaffery Watson Hamilton & DeSanctis LLP

(57) ABSTRACT

Systems and methods for creating a virtual storage appliance on an object store to which an on-premises storage solution has tiered cold data are provided. According to one embodiment, a physical storage system deployed in an on-premises environment replicates hot data of a file system of the physical storage system stored on a set of disks associated with the physical storage system to an object storage service of a hyperscaler to which cold data of the file system has previously been tiered out by the file system. An instance of a virtual storage system may then be created within the hyperscaler that utilizes the object storage service as a primary storage tier. Finally, analytics involving a dataset, including both the data and the cold data, may be performed by accessing the dataset via the virtual storage system.

20 Claims, 9 Drawing Sheets

FACILITATING ANALYTICS INVOLVING COLD DATA TIERED TO AN OBJECT STORE BY AN ON-PREMISES STORAGE SOLUTION BY CREATING A VIRTUAL STORAGE APPLIANCE ON THE OBJECT STORE

BACKGROUND

Field

Various embodiments of the present disclosure generally relate to storage systems and object storage. In particular, some embodiments relate to an approach for making use of cold data tiered to an object storage service of a cloud platform, for example, as part of performing analytics, by creating a virtual storage appliance within the cloud platform that makes use of the object storage service as a primary storage tier.

Description of the Related Art

Storage systems may implement an external cache (e.g., NetApp Flash Cache read cache technology available from NetApp, Inc. of San Jose, CA) to speed access to data through real-time intelligent caching of recently read user data within local, high performance, low latency storage (e.g., local non-volatile memory express (NVMe) storage). In this manner, in the event a subsequent read access relates to data residing within the external cache, the data can be served more quickly than if it were retrieved from the primary storage tier utilized by the storage system.

When a storage system is hosted in a cloud environment, the storage system may be referred to as a virtual storage system. Virtual storage system deployments (e.g., ONTAP technology-based deployments, including, but not limited to, Cloud Volume ONTAP (CVO) and Cloud Volume Service (CVS) available from NetApp, Inc. of San Jose, CA, typically leverage persistent storage in the form of a hyperscaler block storage service (e.g., Amazon Web Services (AWS) Elastic Block Store (EBS) volumes, Google Cloud Platform (GCP) Persistent Disks (PDs), and Microsoft Azure Managed Disks (MDs)) as the data storage media or primary storage tier. The cost profile of these underlying block storage services is generally in the range of $0.17 to $0.18 per Gigabyte (GB).

SUMMARY

Systems and methods are described for creating a virtual storage appliance on an object store to which an on-premises storage solution has tiered cold data. According to one embodiment, a physical storage system deployed in an on-premises environment replicates hot data of a file system of the physical storage system stored on a set of disks associated with the physical storage system to an object storage service of a hyperscaler to which cold data of the file system has previously been tiered out by the file system. An instance of a virtual storage system may then be created within the hyperscaler that utilizes the object storage service as a primary storage tier. Finally, analytics involving a dataset, including both the data and the cold data, may be performed by accessing the dataset via the virtual storage system.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1A:
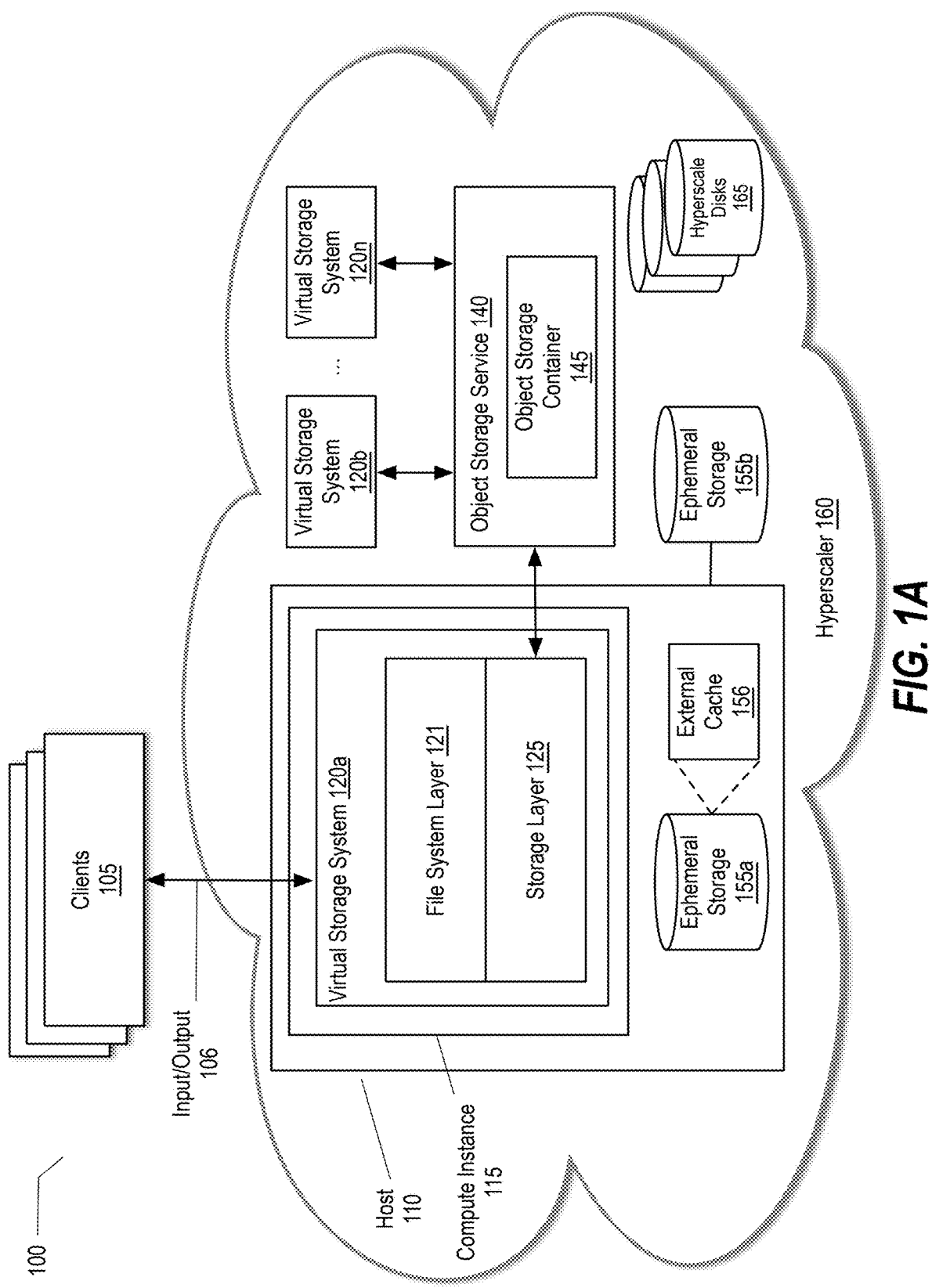
FIG. 1A is a block diagram illustrating an environment in which various embodiments may be implemented.

Systems and methods are described for creating a virtual storage appliance on an object store to which an on-premises storage solution has tiered cold data. The cost profile of hyperscaler based object storage is in the range of $0.02 to $0.03 per GB (significantly lower than hyperscaler based-block storage). While there are tiering solutions (e.g., NetApp Cloud Tiering intelligent data tiering service (formerly, NetApp FabricPool) available from NetApp, Inc. of San Jose, CA) that can help reduce storage costs by tiering cold data to object storage as well as backup solutions (e.g., SnapMirror Cloud available from NetApp, Inc. of San Jose, CA) that enable data from an on-premises storage solution (a physical storage system) to be backed up to object storage, at present there are no storage solutions that make use of object storage as the primary storage tier for a file system in which all file system data and metadata (e.g., data that the file system uses for its bookkeeping, such as directories/folders of end users and bitmaps indicating which PVBNs are in use, index node (inode) files, indirects, etc.) are persisted within object storage that can meet the real-time needs of today's commercial workloads. At least one limitation that currently makes object storage impractical for use as the primary storage tier is the latency associated with performing a double read to service client requests for data, for example, a first read operation (e.g., a GET operation of the Simple Storage Service (S3) protocol or any other protocol for accessing object storage) to retrieve the file system metadata stored within the object store followed by a second read operation to retrieve the actual data requested by the client. The latency of each of these read paths may be on the order of 30 to 100 milliseconds (ms) for completion of the respective GET operations as compared to about 1 ms for reading from a cloud volume.

Embodiments described herein, propose the use of local ephemeral storage (which generally has an access latency of on the order of 200 microseconds (μs)) as an external cache in which all or some subset of file system metadata may be stored, for example, to boost read IOPS and reduce latency of the read path. In various examples, external cache policies are described for adding to, updating, and/or re-warming the external cache to accelerate access to file system metadata, thereby making a virtual storage solution that maintains all file system data and file system metadata within object storage a suitable and cost-effective platform for certain types of workloads. In addition to supporting reasonable read latency, implementation and use of the proposed external cache is expected to provide cost savings relating to charges by the hyperscaler for object storage requests and data retrievals, for example, IOPS, retrieval (e.g., GET), and/or browsing (e.g., LIST), by reducing the reliance on the underlying object store. In some embodiments, in addition to maintaining file system metadata in the external cache, the working set of a workload may also be kept in the external cache to further accelerate read performance of the virtual storage system. Such a virtual storage solution may not be ideal for all types of workloads, especially those with small random I/Os or write intensive workloads; however, there are a variety of workload for which the cost/benefit tradeoffs make absolute sense. For example, implementation of a file system directly on object storage based on the principles proposed herein is expected to provide a good fit for at least for workloads in which the majority of reads and/or writes are sequential as well as for workloads in which their working sets are cacheable.

As described further below, in one embodiment, external cache policies are provided relating to trigger conditions for adding file system metadata to the external cache and re-warming of the external cache. Trigger conditions for adding metadata to the external cache include: (i) whenever a new metadata block is created or a metadata block is overwritten; and (ii) if has not been re-warmed yet, cache insert metadata upon reads from object store (e.g., the typical read path miss). With respect to re-warming, the external cache may be re-warmed on system restart. In one embodiment, re-warming involves saving pointers to special objects having information regarding metadata that were previously in the external cache prior to the system restart and using these special objects to locate the metadata to bring the metadata back into the external cache on a system restart. In an alternative embodiment, assuming a scenario in which the cloud service provider is able to restart the compute instance in which the virtual storage system was running on the same physical host (server) after a recoverable host error, shutdown or reboot, then the external cache remains present and is immediately available within local ephemeral storage upon restart. In some embodiments, the external cache may also cache data, for example, by performing pre-fetching or otherwise maintaining the working set of a workload within the external cache.

As noted above, tiering solutions (e.g., NetApp Cloud Tiering intelligent data tiering service) are available, for example, that help reduce storage costs by tiering cold data from physical on-premises storage systems to object storage After such cold data has been tiered to object storage, however, it is not independently accessible by other means from the cloud. As a result, to the extent some data processing activity (e.g., analytics) involving the entire dataset (both the hot data retained locally by the physical storage system and the cold data, now residing within object storage in the cloud), the cold data generally needs to be reloaded back into the physical storage system, which as described below, may be impractical for various reasons.

Embodiments described herein, propose a novel approach of essentially bringing a virtual clone of the physical storage system to the where the majority of the dataset resides. For example, as described further below, one or more virtual storage systems may be instantiated in the cloud to facilitate efficient access to data previously tiered out to an object store of the cloud by an on-premises physical storage system. Given a typical ratio of cold to hot data of on the order of 80:20, it may be more efficient for purposes of performing analytics and the like on the entire data set to move hot data from the physical storage system to the object storage than to move the cold data tiered to object storage back to the physical storage system.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein, a "cloud" or "cloud environment" broadly and generally refers to a platform through which cloud computing may be delivered via a public network (e.g., the Internet) and/or a private network. The National Institute of Standards and Technology (NIST) defines cloud computing as "a model for enabling ubiquitous, convenient, on-demand network access to a shared pool of configurable computing resources (e.g., networks, servers, storage, applications, and services) that can be rapidly provisioned and released with minimal management effort or service provider interaction." P. Mell, T. Grance, The NIST Definition of Cloud Computing, National Institute of Standards and Technology, USA, 2011. The infrastructure of a cloud may cloud may be deployed in accordance with various deployment models, including private cloud, community cloud, public cloud, and hybrid cloud. In the private cloud deployment model, the cloud infrastructure is provisioned for exclusive use by a single organization comprising multiple consumers (e.g., business units), may be owned, managed, and operated by the organization, a third party, or some combination of them, and may exist on or off premises. In the community cloud deployment model, the cloud infrastructure is provisioned for exclusive use by a specific community of consumers from organizations that have shared concerns (e.g., mission, security requirements, policy, and compliance considerations), may be owned, managed, and operated by one or more of the organizations in the community, a third party, or some combination of them, and may exist on or off premises. In the public cloud deployment model, the cloud infrastructure is provisioned for open use by the general public, may be owned, managed, and operated by a cloud provider (e.g., a business, academic, or government organization, or some combination of them), and exists on the premises of the cloud provider. The cloud service provider may offer a cloud-based platform, infrastructure, application, or storage services as-a-service, in accordance with a number of service models, including Software-as-a-Service (SaaS), Platform-as-a-Service (PaaS), and/or Infrastructure-as-a-Service (IaaS). In the hybrid cloud deployment model, the cloud infrastructure is a composition of two or more distinct cloud infrastructures (private, community, or public) that remain unique entities, but are bound together by standardized or proprietary technology that enables data and application portability (e.g., cloud bursting for load balancing between clouds).

As used herein, a "storage system" or "storage appliance" generally refers to a type of computing appliance or node that provides data to, or manages data for, other computing devices or clients (e.g., applications). The storage system may be part of a cluster of multiple nodes (which may also be referred to herein as a storage system) representing a distributed storage system. In various examples described herein, a storage system may be run (e.g., on a VM or as a containerized instance, as the case may be) within a cloud environment of a public cloud provider or a hyperscaler.

As used herein, a "storage primary tier" generally refers to a persistent data storage media that is responsible for storing data that is in active use by a file system of a storage system and which typically includes metadata and some additional data. In various examples described herein, the active data may be referred to as hot data.

As used herein, a "working set" generally refers to the data that a process, workflow, or workload creates or uses in a predetermined or configurable period of time. The working set may be thought of as hot or commonly accessed data by the workload at issue.

As used herein, the term "storage operating system" generally refers to computer-executable code operable on a computer to perform a storage function that manages data access and may, in the case of a storage system (e.g., a node), implement data access semantics of a general purpose operating system. The storage operating system can also be implemented as a microkernel, an application program operating over a general-purpose operating system, such as UNIX or Windows NT, or as a general-purpose operating system with configurable functionality, which is configured for storage applications as described herein.

As used herein a "consistency point" or "CP" generally refers to the act of writing data to a primary storage tier utilized by a storage system and updating active file system pointers. In various examples, when a file system of a storage system receives a write request, it commits the data to permanent storage before the request is confirmed to the writer. Otherwise, if the storage system were to experience a failure with data only in volatile memory, that data would be lost, and underlying file structures could become corrupted. Physical storage appliances commonly use battery-backed high-speed non-volatile random access memory (NVRAM) as a journaling storage media to journal writes and accelerate write performance while providing permanence, because writing to memory is much faster than writing to storage (e.g., disk). Storage systems may also implement a buffer cache in the form of an in-memory cache to cache data that is read from data storage media (e.g., local mass storage devices or a storage array associated with the storage system) as well as data modified by write requests. In this manner, in the event a subsequent access relates to data residing within the buffer cache, the data can be served from local, high performance, low latency storage, thereby improving overall performance of the storage system. Some virtual storage appliances may use NV storage backed by cloud volumes in place of NVRAM for journaling storage and for the buffer cache. Regardless of whether NVRAM or NV storage is utilized, the modified data may be periodically (e.g., every few seconds) flushed to the data storage media. As the buffer cache may be limited in size, an additional cache level may be provided by a victim cache, typically implemented within a slower memory or storage device than utilized by the buffer cache, that stores data evicted from the buffer cache. In the context of a virtual storage system making use of an object store as the primary storage tier, journaling (or NVlogging) may be performed within memory of the host on which the virtual storage system is running or to a journaling object maintained within the object store The event of saving the modified data to the mass storage devices may be referred to as a CP. At a CP, the file system may save any data that was modified by write requests to persistent data storage media. As will be appreciated, when using a buffer cache, there is a small risk of a system failure occurring between CPs, causing the loss of data modified after the last CP. Consequently, the storage system may maintain an operation log or journal of certain storage operations within the journaling storage media that have been performed since the last CP. This log may include a separate journal entry (e.g., including an operation header) for each storage request received from a client that results in a modification to the file system or data. Such entries for a given file may include, for example, "Create File," "Write File Data," and the like. Depending upon the operating mode or configuration of the storage system, each journal entry may also include the data to be written according to the corresponding request. The journal may be used in the event of a failure to recover data that would otherwise be lost. For example, in the event of a failure, it may be possible to replay the journal to reconstruct the current state of stored data just prior to the failure. In various examples there may be one or more predefined or configurable triggers (CP triggers) including one or more triggers based on time, based on a number or write requests, and/or based on events occurring within the file system. Responsive to a given CP trigger (or at a CP), the file system may save any data that was modified by write requests to persistent data storage media. As will be appreciated, new or updated file system metadata may also be generated during a CP.

As used herein, "ephemeral storage" or an "ephemeral disk" generally refers to volatile temporary storage that is physically attached to the same host on which a compute instance is running and which is present during the running lifetime of the compute instance. For example, ephemeral storage may represent one or more internal or external hard-disk drives (HDDs and/or solid-state drives (SSDs) of the physical host that are directly attached (i.e., without going through one or more intermediate devices of a network) to the physical host though an interface (e.g., Small Computer System Interface (SCSI), Serial Advanced Technology Attachment (SATA), Serial-Attached SCSI (SAS), FC or Internet SCSI (iSCSI)). Ephemeral storage is not networked. That is, there are no connections through Ethernet or FC switches as is the case for network-attached storage (NAS) or a storage area network (SAN). Non-limiting examples of ephemeral storage include an Elastic Compute Cloud (EC2) instance store in the context of Amazon Web Services (AWS), an ephemeral operating system (OS) disk in the context of Microsoft Azure, and ephemeral disks (local SSD) in the context of Google Cloud Platform (GCP). As noted above, in the event a compute instance goes down due to an underlying recoverable host error, it is assumed herein that the cloud service provider will bring up the compute instance on the same host, thereby maintaining access to data (e.g., an operation log or journal) stored or otherwise flushed to the ephemeral storage by a virtual storage system associated with the compute instance.

As used herein, an "object storage service," "object storage," or simply an "object store," generally refers to a service that implements a data storage architecture for storing unstructured data, for example, that sections data into units (e.g., objects) and stores them in a structurally flat data environment, which may be referred to generally as an object storage container. Non-limiting examples, of a cloud object storage services include Amazon S3, Google Cloud Storage, and Azure Blob storage.

As used herein, an "object storage container" generally refers to a storage resource or container within an object storage namespace of an object storage service for maintaining objects. Non-limiting examples of object storage containers include an Amazon S3 bucket, a Google Storage bucket, and an Azure container.

As used herein, a "storage volume" or "volume" generally refers to a container in which applications, databases, and file systems store data. A volume is a logical component created for a host system (e.g., a client) that makes use of a storage system to access storage of the underlying primary storage tier associated with the storage system. A volume may be created from the capacity available in storage pod, a pool, or a volume group. A volume has a defined capacity. Although a volume might consist of more than one storage drive, a volume appears as one logical component to the host (e.g., a client). Non-limiting examples of a volume include a flexible volume and a flexgroup volume.

As used herein, a "flexible volume" generally refers to a type of storage volume that may traditionally be efficiently distributed across multiple storage devices or in the context of various examples described herein, multiple storage object container. A flexible volume may be capable of being resized to meet changing business or application requirements. In some embodiments, a storage system may provide one or more aggregates and one or more storage volumes distributed across a plurality of nodes interconnected as a cluster. Each of the storage volumes may be configured to store data such as files and logical units. As such, in some embodiments, a flexible volume may be comprised within a storage aggregate and further comprises at least one storage device or multiple storage object containers. The storage aggregate may be abstracted over a RAID plex where each plex comprises a RAID group. Moreover, each RAID group may comprise a plurality of storage disks (or groups of multiple storage object containers). As such, a flexible volume may comprise data storage spread over multiple storage disks or devices (or groups of multiple storage object containers). A flexible volume may be loosely coupled to its containing aggregate (e.g., a file system aggregate, such as a WAFL aggregate). A flexible volume can share its containing aggregate with other flexible volumes. Thus, a single aggregate can be the shared source of all the storage used by all the flexible volumes contained by that aggregate. A non-limiting example of a flexible volume is a NetApp ONTAP Flex Vol volume.

As used herein, a "flexgroup volume" generally refers to a single namespace that is made up of multiple constituent/member volumes. A non-limiting example of a flexgroup volume is a NetApp ONTAP FlexGroup volume that can be managed by storage administrators, and which acts like a NetApp Flex Vol volume. In the context of a flexgroup volume, "constituent volume" and "member volume" are interchangeable terms that refer to the underlying volumes (e.g., flexible volumes) that make up the flexgroup volume.

As used herein, "hot data" generally refers to data that is frequently accessed by a file system of a storage system and file system metadata. The file system of a storage system may maintain one or more metrics indicative of frequency of access and/or the last time data was accessed. Such metrics may be maintained at various levels of granularity, for example, at the block-level, file-level, directory-level, and/or at the volume-level. Hot data is typically maintained within a performance or a capacity tier of the storage system, for example, hot data may be stored on fast storage, for instance SSDs and/or on a combination of SSDs and HDDs.

As used herein, "cold data" generally refers to data that is rarely accessed. For example, data that has not been accessed for a configurable or predetermined amount of time (e.g., 31 days) may be considered cold data. Depending on the particular implementation of a file system of a physical storage system, cold data may be manually selected by an administrative user, for example, via a reporting dashboard presented by the storage system, to cause the storage system to tier such data out to cold storage in the cloud (e.g., an object storage service provided by a cloud service provider). Alternatively or additionally, based on one or more metrics indicative of frequency of access and/or the last time data was accessed, the file system may perform automated tiering of cold data to low-cost object storage.

Example Operating Environment

FIG. 1A is a block diagram illustrating an environment 100 in which various embodiments may be implemented. In various examples described herein, a virtual storage system 120a, which may be considered exemplary of virtual storage systems 120b-n, may be run, for example, within a compute instance 115 (e.g., a virtual machine (VM) or a containerized instance, as the case may be) on a host 110 (e.g., a physical server) within a public cloud provided by a public cloud provider (e.g., hyperscaler 160). In the context of the present example, a cloud-based storage deployment, for example, in the form of a cluster of two or more of virtual storage systems 120a-n, running respective instances of a storage operating system (not shown), makes use of one or more object storage containers (e.g., object storage container 145) of an object storage service 140 as the primary storage tier rather than a disk tier (e.g., hyperscale disks 165) provided by the hyperscaler 160, for example, in the form of solid-state drive (SSD) backed or hard-disk drive (HDD) backed disks. Non-limiting examples of hyperscaler 160 include Amazon, Google, Microsoft, IBM, and Oracle.

According to one embodiment, ephemeral storage (e.g., ephemeral storage 155a and/or ephemeral storage 155b) may be used to implement an external cache 156. Ephemeral storage may represent direct-attached-storage (DAS) to host 110 in the form of one or more internal (e.g., ephemeral storage 155a) and/or external (e.g., ephemeral storage 155b) storage devices, such as HDDs and/or SSDs, to host 110. Ephemeral storage may be directly attached to host 110 through a physical host interface (e.g., SCSI, SATA, or SAS)). That is, the ephemeral storage is not networked and traffic exchanged between the host 110 and the ephemeral storage does not pass through any intermediate network devices associated with the cloud environment. In various embodiments described herein, the external cache may be used as a file system cache in which file system metadata associated with data recently read from the object storage service 140 is cached to facilitate subsequent read path processing performed by the virtual storage system 120a. For example, various policies are described below to trigger the addition of metadata to the external cache and/or re-warming of the external cache to proactively make available metadata data needed for the read path within the external cache. In this manner, the overall cost of software-based cloud storage deployments (e.g., a distributed storage system in the form of a cluster of two or more of virtual storage systems 120a-n) may be reduced and other advantages of cloud object storage services may be leveraged while also accelerating the performance of read accesses. For example, by maintaining file system metadata for recently read data within the external cache 156, read latency may be improved for a subsequent read of the same data for which file system metadata is present in the external cache 156 as the latency associated with retrieval of such file system metadata from the underlying primary storage tier (e.g., one or more object storage containers, such as object storage container 145 of an object storage service, such as object storage service 140) utilized by the cloud-based storage deployment may be avoided. While in the context of the present example, the external cache 156 is shown located within internal ephemeral storage 155a, it is to be appreciated the external cache 156 may alternatively be located within external ephemeral storage 155b.

The virtual storage system 120a may present storage over a network to clients 105 using various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. Clients 105 may request services of the virtual storage system 120a by issuing Input/Output requests 106 (e.g., file system protocol or storage protocol messages (in the form of packets) over the network). A representative client of clients 105 may comprise an application, such as a database application, executing on a computer that "connects" to the virtual storage system 120a over a computer network, such as a point-to-point link, a shared local area network (LAN), a wide area network (WAN), or a virtual private network (VPN) implemented over a public network, such as the Internet.

In the context of the present example, the virtual storage system 120a is shown including a number of layers, including a file system layer 121 and a storage layer 125. These layers may represent components of data management software or the storage operating system of the virtual storage system 120a. The file system layer 121 generally defines the basic interfaces and data structures in support of file system operations (e.g., initialization, mounting, unmounting, creating files, creating directories, opening files, writing to files, and reading from files). A non-limiting example of the file system layer 121 is the Write Anywhere File Layout (WAFL) Copy-on-Write file system (which represents a component or layer of ONTAP software available from NetApp, Inc. of San Jose, CA). Illustratively, the storage operating system implemented by the virtual storage system 120a may be the Data ONTAP operating system available from NetApp, Inc., San Jose, Calif. that implements the WAFL file system. However, it is expressly contemplated that any appropriate storage operating system may be enhanced for use in accordance with the inventive principles described herein. As such, where the term "WAFL" is employed, it should be taken broadly to refer to any file system (e.g., a copy-on-write file system, a write-anywhere file system, a write in place file system, or the like) that is otherwise adaptable to the teachings of this disclosure.

Depending on the particular deployment, for example, to facilitate implementation of a high-availability (HA) configuration of a pair or group of virtual storage systems 120a-n, one of the virtual storage systems 120a-n of the HA pair or group may reside in a first location or region within a geographic area or availability zone of the cloud provider that is insulated from failures in a second location within the geographic area or availability zone in which another of the virtual storage systems 120a-n of the HA pair or group resides. Alternatively, HA peers may reside within different geographic areas or availability zones.

The storage layer 125 may include storage drivers for interacting with object storage containers (e.g., object storage container 145) via the object storage service 140, for example, via application programming interfaces (APIs) exposed by the object storage service 140.

The various layers described herein, and the processing described below with reference to the flow diagrams of FIGS. 5-7 may be implemented in the form of executable instructions stored on a machine readable medium and executed by one or more processing resources (e.g., one or more of a microcontroller, a microprocessor, central processing unit core(s), an application-specific integrated circuit (ASIC), a field programmable gate array (FPGA), and/or the like) and/or in the form of other types of electronic circuitry. For example, the processing may be performed by one or more virtual or physical computer systems of various forms (e.g., servers, blades, network storage systems or appliances, and/or storage arrays, such as the computer system described with reference to FIG. 8 below.

Example Mapping of a Block Number Space to Objects

Figure 2:
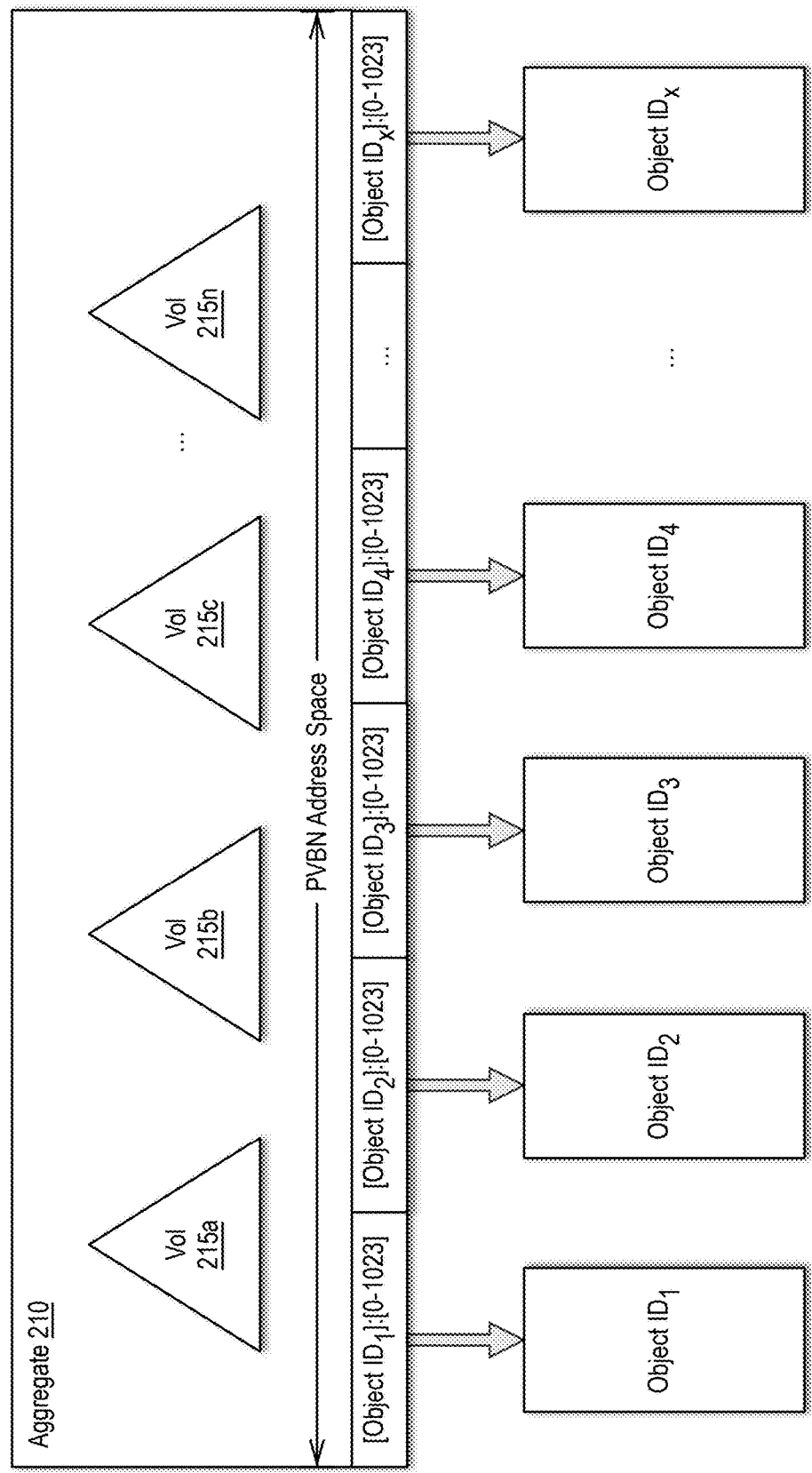
FIG. 2 is a block diagram illustrating how a block number space (e.g., a physical volume block number (PVBN) address space maps to objects in accordance with an embodiment of the present disclosure FIG. 3 is a block diagram illustrating a PVBN format in accordance with an embodiment of the present disclosure.

FIG. 2 is a block diagram illustrating how a block number space (e.g., a physical volume block number (PVBN) address space maps to objects in accordance with an embodiment of the present disclosure. In a traditional cloud-based storage system in which the underlying storage primary tier utilized by the file system (e.g., file system layer 121) is represented by disks (e.g., cloud volumes of a cloud provider, such as hyperscaler 160), indexing of data blocks within an aggregate (e.g., a collection of disks) is via aggregate-level PVBNs which map PVBN to a disk and disk block number.

In various examples herein, a simple PVBN space mapping is implemented in which the block number space of an aggregate (e.g., aggregate 210) including multiple volumes (e.g., volumes 215a-n) expands over objects, which may each use multiple 4 KB data blocks, consuming on the order of about 4 MB). In the context of the present example, each object (e.g., Object $ID_{1-x}$) may include 1024 slots (e.g., numbers 0 to 1023), where each slot is of size 4 KB. An example of a PVBN format corresponding to such a partitioning of an object is described below with reference to FIG. 3A. The most significant 3 bits of the PVBN in could be reserved for Bin ID which can indicate the type of underlying storage, thus helping the file system in interpreting the PVBN.

Depending on the particular implementation and the nature of the underlying object store, there may be various options for allocating object IDs. In one embodiment, a fixed set of object IDs are used in which there is a direct mapping of a given object ID within the PVBN space to a given object ID in the object storage service (e.g., object storage service 140). If the object storage service provides strong consistency, then reusing object IDs is possible and hence working with a fixed set of object IDs is possible. If the object storage service does not provide strong consistency, the use of monotonically increasing object IDs may be employed. In such as a case, however, a mapping of object IDs in the PVBN space to corresponding object IDs in the object storage service will need to be maintained. In both object ID allocation schemes, a limited set of object IDs, proportional to the aggregate PVBN space, will be in use at any point of time. As such, it will be appreciated some form of garbage collection should be implemented to maintain as set of completely free object IDs that are available for use. For purposes of simplicity, in the context of various examples described herein, it is assumed a fixed set of object IDs are used.

The file system metafiles continue to track various file system metadata, such as free blocks, free inodes, directories, etc. in the usual manner.

While in the present example, as a design choice, objects are divided into 1024 slots, it is to be appreciated objects may be divided into more or fewer slots depending on the particular implementation. As those skilled in the art will appreciate, while only a particular slot of a given object may be modified by a given write operation and despite the file system representing a block-based file system, the entire give object will be written, for example, by way of an atomic read-modify-write (RMW) operation due to the lowest level of granularity supported by the object store being an object. In a file system, such as WAFL, that always does new writes to free blocks in the file system (i.e., there are no in-place over-writes), it naturally suits writing to object stores where entire objects need to be written.

Example PVBN Format

Figure 3:
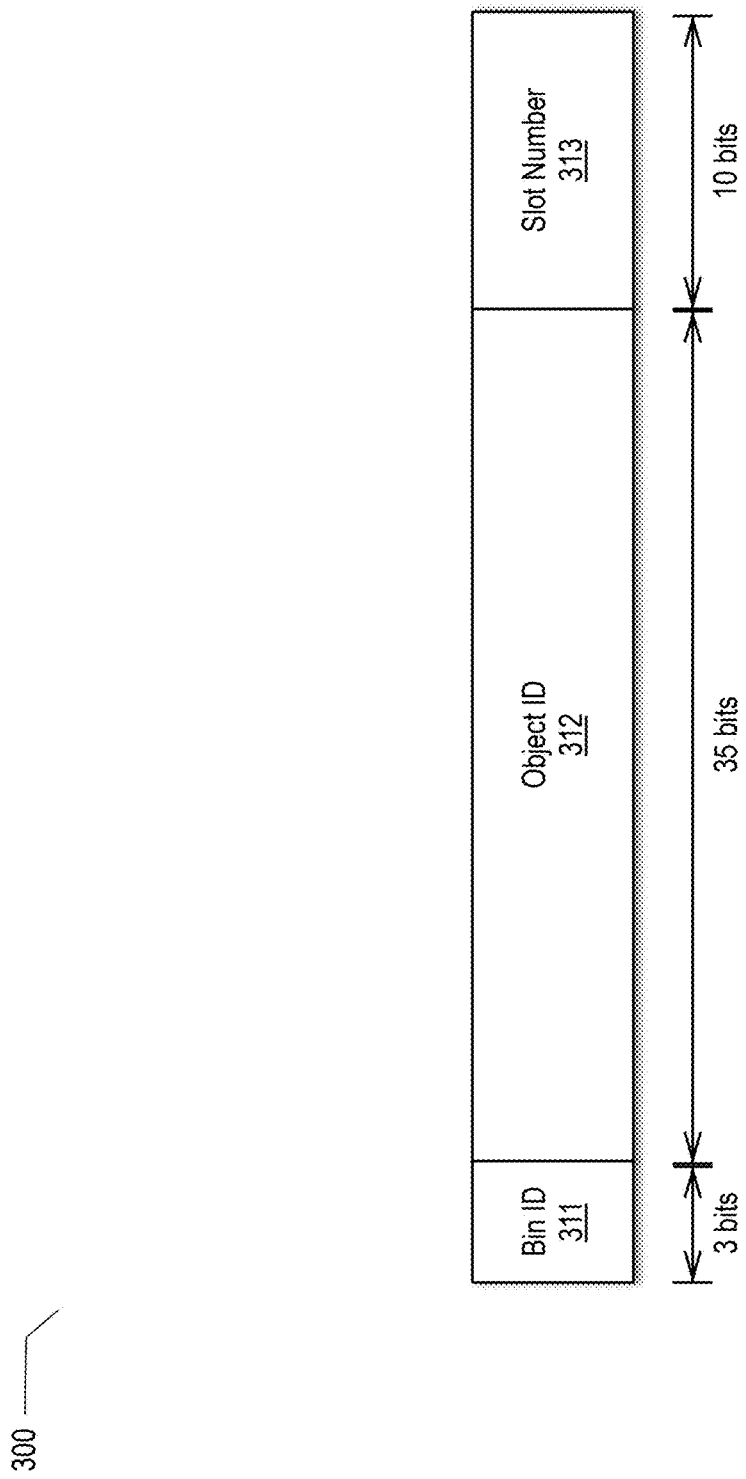

FIG. 3 is a block diagram illustrating a PVBN format 300 in accordance with an embodiment of the present disclosure. In the context of the present example, the PVBN format 300 represents a more or less standard WAFL 48-bit PVBN including a 3-bit bin ID, a 35-bit object ID, and a 10-bit slot number. Assuming each slot corresponds to a 4 KB data block, the size of each object will be approximately 4 MB and over 32 billion object IDs are supported. The most significant 3 bits of the PVBN in WAFL is reserved for the bin ID 311, which may be used to indicate the type of underlying storage, thus helping WAFL in interpreting the PVBN.

Example File System Layout

In one embodiment, data containers or container files represented in the write-anywhere file system as respective inode data structures that may be persisted to object storage (e.g., object storage service 140). The inode may include a metadata section and a data section. The information stored in the metadata section of each inode describes the container file (e.g., a volume, a directory, a subdirectory, a file, a snapshot, etc.) and, as such, may include the type (e.g., regular, directory, vdisk) of file, its size, time stamps (e.g., access and/or modification time) and ownership (e.g., user identifier (UID) and group ID (GID), of the file, and a generation number. The contents of the data section of each inode may be interpreted differently depending upon the type of file (inode) defined within the type field. For example, the data section of a directory inode includes metadata controlled by the file system, whereas the data section of a regular inode includes file system data. In this latter case, the data section includes a representation of the data associated with the file.

Specifically, the data section of a regular on-disk inode (or disk inode) may include file system data or pointers, the latter referencing 4 KB data blocks on the primary storage tier (e.g., on disk or persisted within objects of an object storage service (e.g., object storage service 140) in the context of various examples described herein) to store the file system data. Each pointer may be a block number (e.g., a logical VBN to facilitate efficiency among the file system and the RAID system when accessing the data from the primary storage tier). Given the restricted size (e.g., 128 bytes) of the inode, file system data having a size that is less than or equal to 64 bytes may be represented, in its entirety, within the data section of that inode. However, if the length of the contents of the data container or container file exceeds 64 bytes but less than or equal to 64 KB, then the data section of the inode (e.g., a first level inode) may include up to 16 pointers, each of which references a 4 KB block of data within a given object stored within the object storage service.

Moreover, if the size of the data is greater than a first threshold (e.g., X KB) but less than or equal to a second threshold (e.g., Y megabytes (MB)), then each pointer in the data section of the inode (e.g., a second level inode) references an indirect block (e.g., a first level L1 block) that contains a number (e.g., Z) pointers, each of which references a 4 KB data block within a given object stored within the object storage service.

For file system data having a size greater than the second threshold, each pointer in the data section of the inode (e.g., a third level L3 inode) may reference a double-indirect block (e.g., a second level L2 block) that contains Z pointers, each referencing an indirect (e.g., a first level L1) block. The indirect block, in turn, which contains Z pointers, each of which references a 4 KB data block on disk. When accessing a file, each block of the file may be loaded from disk into memory (e.g., memory 224). In other embodiments, higher levels are also possible that may be used to handle larger data container or container file sizes.

When an on-disk inode (or block) is loaded from the object storage service into memory, its corresponding in-core structure embeds the on-disk structure. The in-core structure is a block of memory that stores the on-disk structure plus additional information needed to manage data in the memory (but not within the object storage service). To the extent write data is cached, the additional information may include, e.g., a "dirty" bit. After data in the inode (or block) is updated/modified as instructed by, e.g., a write operation, the modified data is marked "dirty" using the dirty bit so that the inode (block) can be subsequently "flushed" (stored) to disk.

According to one embodiment, a file in a file system comprises a buffer tree that provides an internal representation of blocks for a file loaded into memory and maintained by the write-anywhere file system 360. A root (top-level) buffer, such as the data section embedded in an inode, references indirect (e.g., level 1) blocks. In other embodiments, there may be additional levels of indirect blocks (e.g., level 2, level 3) depending upon the size of the file. The indirect blocks (e.g., inodes) includes pointers that ultimately reference data blocks used to store the actual data of the file. That is, the data of file is contained in data blocks and the locations of these blocks (representing file system metadata) are stored in the indirect blocks of the file. Each level 1 indirect block may include pointers to as many as 224 data blocks. According to the "write anywhere" nature of the file system, these blocks may be located anywhere within the PVBN space of an aggregate (e.g., aggregate 210).

In one embodiment, a file system layout is provided that apportions an underlying physical volume into one or more virtual volumes (or flexible volumes) of a storage system, such as virtual storage system 120*a* or a cluster including two or more of virtual storage systems 120*a*-*n*. Depending on the particular implementation, the underlying physical volume may be the aggregate. The file system may also maintain metadata, such as block allocation structures, within the PVBN space of the aggregate. Each flexible volume has its own virtual volume block number (VVBN) space and maintains metadata, such as block allocation structures, within that VVBN space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In a further embodiment, PVBNs are used as block pointers within buffer trees of files stored in a flexible volume. This "hybrid" flexible volume example involves the insertion of only the PVBN in the parent indirect block (e.g., inode or indirect block). On a read path of a logical volume, a "logical" volume (vol) info block has one or more pointers that reference one or more fsinfo blocks, each of which, in turn, points to an inode file and its corresponding inode buffer tree. The read path on a flexible volume is generally the same, following PVBNs (instead of VVBNs) to find appropriate locations of blocks; in this context, the read path (and corresponding read performance) of a flexible volume is substantially similar to that of a physical volume.

In a dual VBN hybrid flexible volume example, both a PVBN and its corresponding VVBN are inserted in the parent indirect blocks in the buffer tree of a file. That is, the PVBN and VVBN are stored as a pair for each block pointer in most buffer tree structures that have pointers to other blocks, e.g., level 1 (L1) indirect blocks, inode file level 0 (L0) blocks.

A root (top-level) buffer, such as the data section embedded in an inode, references indirect (e.g., level 1) blocks. Note that there may be additional levels of indirect blocks (e.g., level 2, level 3) depending upon the size of the file. The indirect blocks (and inode) include PVBN/VVBN pointer pair structures that ultimately reference data blocks used to store the actual data of the file. The PVBNs reference locations within the aggregate, whereas the VVBNs reference locations within files of the flexible volume. The use of PVBNs as block pointers in the indirect blocks provides efficiencies in the read paths, while the use of VVBN block pointers provides efficient access to required metadata. That is, when freeing a block of a file, the parent indirect block in the file contains readily available VVBN block pointers, which avoids the latency associated with accessing an owner map to perform PVBN-to-VVBN translations; yet, on the read path, the PVBN is available.

Example Hierarchical Inode Tree

Figure 4:
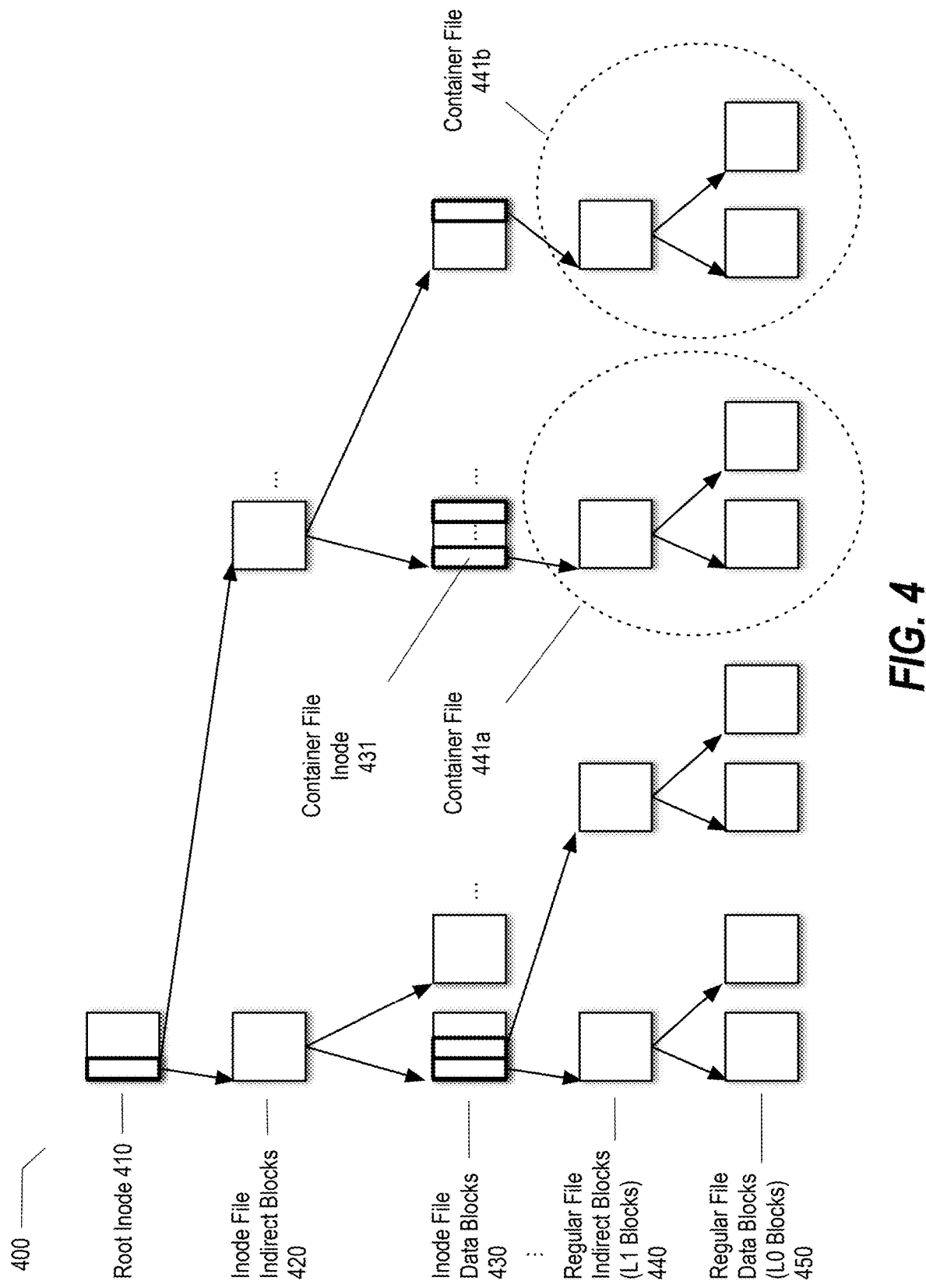
FIG. 4 is a block diagram illustrating a tree of blocks representing of an example a file system layout in accordance with an embodiment of the present disclosure.

FIG. 4 is a block diagram illustrating a tree of blocks 400 representing a simplified view of an example a file system layout in accordance with an embodiment of the present disclosure. In one embodiment, the storage system nodes (e.g., virtual storage systems 120*a*-*n*) make use of a write anywhere file system (e.g., the WAFL file system). The write anywhere file system may represent a UNIX compatible file system that is optimized for network file access. In the context of the present example, the write anywhere file system is a block-based file system that represents file system data (e.g., a block map file and an inode map file), metadata files, and data containers or container files (e.g., volumes, subdirectories, directories, and regular files) in a tree of blocks (e.g., tree of blocks 400). Keeping metadata in files allows the file system to write metadata blocks anywhere within the primary storage tier and makes it easier to increase the size of the file system on the fly.

In this simplified example, the tree of blocks 400 has a root inode 410, which describes an inode map file (not shown), made up of inode file indirect blocks 420 and inode file data blocks 430. The file system may use inodes (e.g., inode file data blocks 430) to describe container files (e.g., container file 441*a* and container file 441*b*). In one embodiment, each inode contains 16 block pointers (e.g., PVBNs specifying respective data block locations within an aggregate (e.g., aggregate 210)) to indicate which data blocks (e.g., of 4 KB) belong to a given container file. Inodes for container files smaller than 64 KB may use the 156 block pointers to point to file data blocks or simply data blocks (e.g., regular file data blocks, which may also be referred to herein as L0 blocks 450). Inodes for files smaller than 64 MB may point to indirect blocks (e.g., regular file indirect blocks, which may also be referred to herein as L1 blocks 440), which point to actual file data. Inodes for larger container files or data containers may point to doubly indirect blocks. For very small files, data may be stored in the inode itself in place of the block pointers. In the context of the present example, non-limiting examples of file system metadata include inodes (e.g., container file inode 431) and indirects (e.g., inode file indirect blocks 420, regular file indirect blocks 440 (L1 blocks), L2 blocks (not shown), L3 blocks (not shown), etc.). Other non-limiting examples of file system metadata include PVBN-based bit maps (not shown) used by the file system to track PVBNs that are in use and map files, such as the inode file (not shown). Additional details regarding a specific implementation of a write anywhere file system are provided in U.S. Pat. No. 6,239,356, which is incorporated by reference herein in its entirety for all purposes.

Example Read Performance Acceleration

Figure 5:
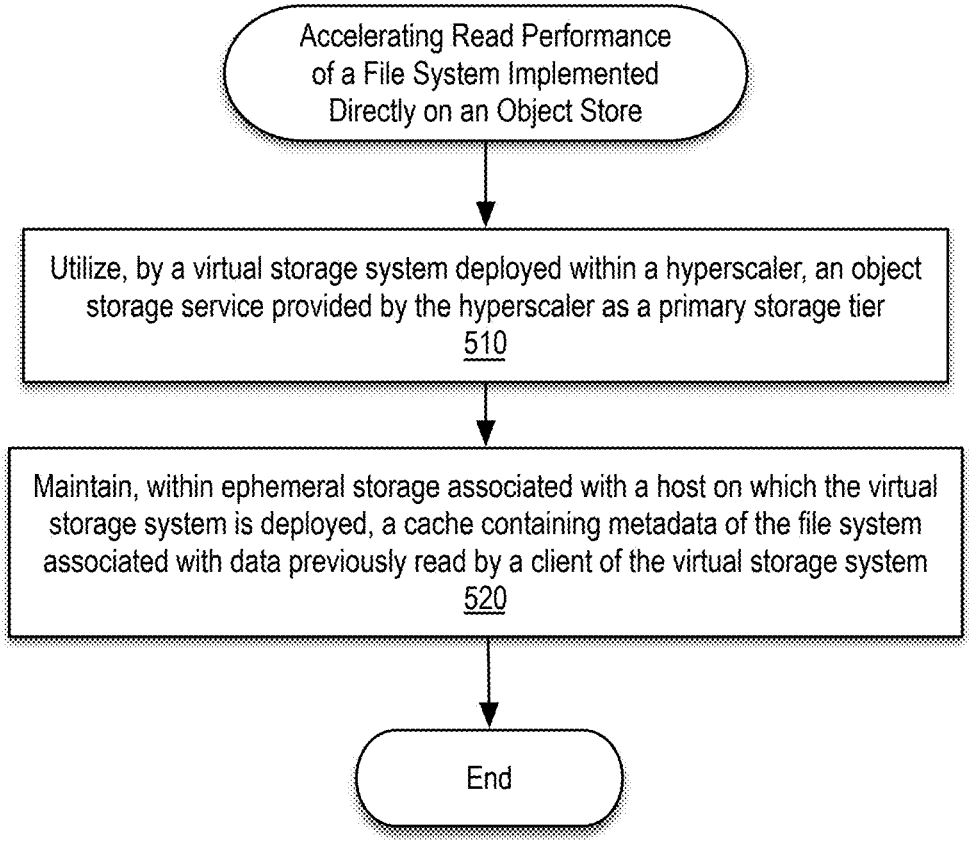
FIG. 5 is a high-level flow diagram illustrating operations for accelerating read performance by a file system of a virtual storage system that makes use of object storage as a primary storage tier in accordance with an embodiment of the present disclosure.

FIG. 5 is a high-level flow diagram illustrating operations for accelerating read performance by a file system of a virtual storage system that makes use of object storage as a primary storage tier in accordance with an embodiment of the present disclosure. The processing described with reference to FIG. 5 may be performed by a node (e.g., virtual storage system 120a) operating alone as a storage system or as part of a cluster of nodes (e.g., two or more of virtual storage systems 120a-n) operating as a distributed storage system.

At block 510, a virtual storage system (e.g., one or more of virtual storage systems 120a-n) deployed within a hyperscaler (e.g., hyperscaler 160) utilizes an object storage service (e.g., object storage service 145) provided by the hyperscaler as a primary storage tier. In one embodiment, the need for cloud volumes supplied by the hyperscaler may be eliminated by using the object storage service as the persistent store for a file system of the virtual storage system. For example, all metadata of the file system and all data of the file system may be persisted in objects maintained within the object storage service.

At block 520, the virtual storage system maintains a cache (e.g., external cache 156) within ephemeral storage (e.g., ephemeral storage 155a or 155b) associated with a host (e.g., host 110) on which the virtual storage system is running. In order to accelerate read performance and avoid the double-read issue described above, the cache may include a current copy of all metadata of the file system associated with data previously read by a client of the virtual storage system. For example, an initial read relating to data within a particular data block may trigger the insertion of the corresponding metadata into the cache, thereby allowing a subsequent read relating to the data to be performed more efficiently based on the presence of the corresponding metadata within the cache. A non-limiting example, of caching policy event handling that may be part of maintenance of the cache, for example, to keep the cache current and re-warm the cache after a system restart is described further below with reference to FIG. 6.

While in the context of the present example, a single virtual storage system (e.g., a storage system comprises of one of virtual storage systems 120a-n or a cluster (a distributed storage system) of two or more of virtual storage systems 120a-n) is described as performing read performance acceleration, it is to be appreciated given the multi-attach capabilities of object stores, in some examples, there may be one virtual storage system (e.g., a storage system comprises of one of virtual storage systems 120a-n or a cluster (a distributed storage system) of two or more of virtual storage systems 120a-n) having write access to the object store and one or more virtual storage systems (e.g., one or more storage systems comprises of one of virtual storage systems 120a-n and/or one or more clusters (distributed storage systems) of two or more of virtual storage systems 120a-n) with read-only access to the object store any subset of which or all of which may be configured to provide the read performance acceleration described herein.

Example Caching Policies

Figure 6:
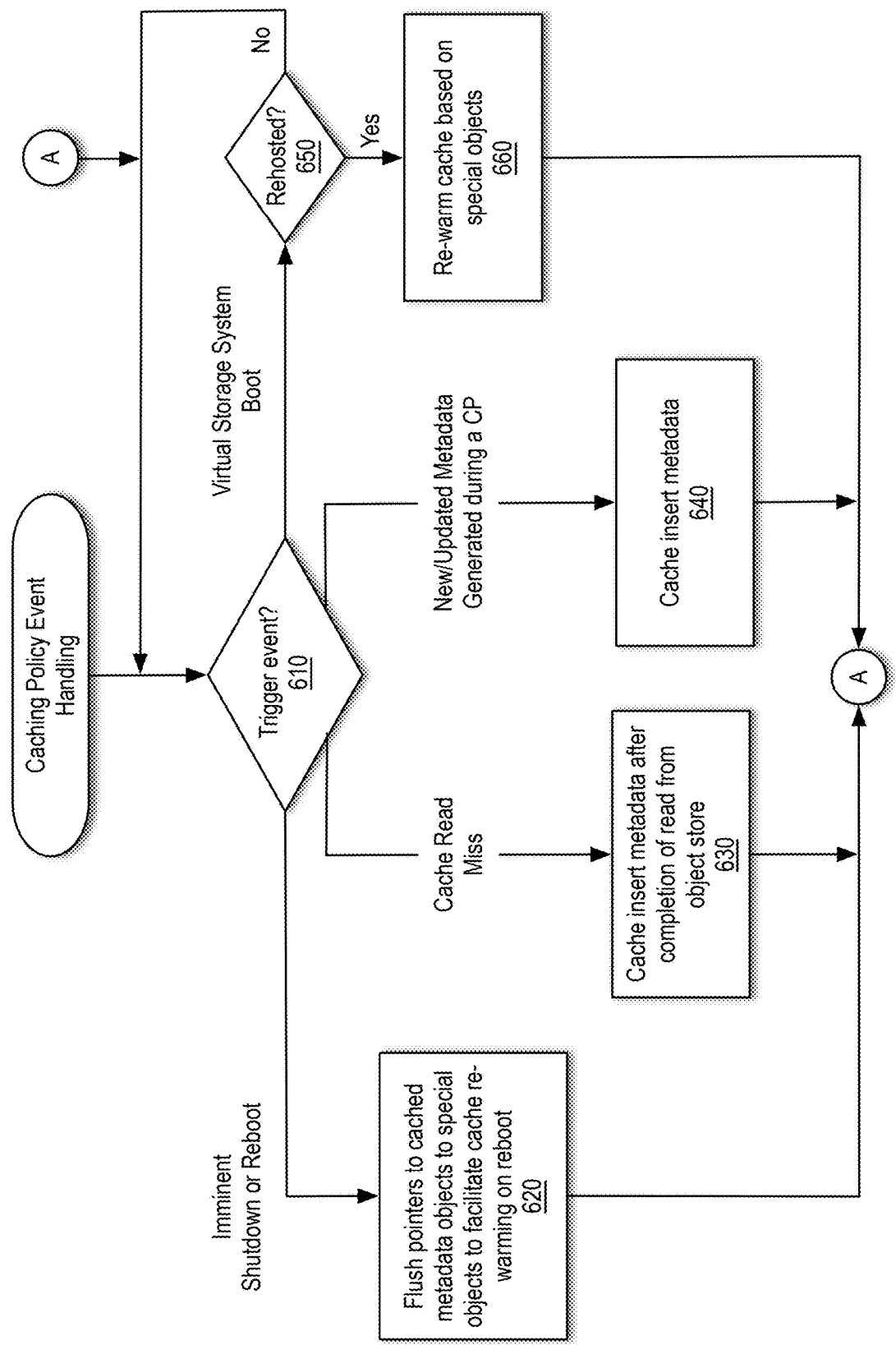
FIG. 6 is a flow diagram illustrating operations for performing caching policy event handling in accordance with an embodiment of the present disclosure.

FIG. 6 is a flow diagram illustrating operations for performing caching policy event handling in accordance with an embodiment of the present disclosure. The algorithm and policies described with reference to FIG. 6 will cause significant portions of the file system metadata to be cached within the external cache. As above, the processing described with reference to FIG. 6 may be performed by a node (e.g., virtual storage system 120a) operating alone as a storage system or as part of a cluster of nodes (e.g., two or more of virtual storage systems 120a-n) operating as a distributed storage system. The processing described with reference to FIG. 6 may represent operations performed as part of block 520 of FIG. 5. According to one embodiment, caching policies may be defined within the file system (e.g., file system layer 121) to trigger various actions involving the cache. For example, various caching policies trigger the addition of new file system metadata to the cache, updating of existing file system metadata present within the cache when such metadata changes, and potentially other processing, for example, to support re-warming of the cache after a restart of the virtual storage system.

At decision block 610, the file system may determine whether a trigger event associated with one of the caching policies has occurred. In the context of the present example, if an event indicative of an imminent shutdown or reboot of the virtual storage system is observed, processing continues with block 620, after a cache read miss, processing continues with block 630, when new or updated metadata has been generated, for example, during a CP, processing continues with block 640, and after a reboot of the virtual storage system, processing branches to decision block 650. In one embodiment, the event indicative of an imminent shutdown or reboot may be as a result of a planned or unplanned shutdown, for example, as part of a software upgrade or patch being applied to the storage operating system or due to various ungraceful reboot scenarios (e.g., a compute instance or VM panic or a recoverable host error). In one example, the cache read miss represents read path processing in which a check of the cache reveals file system metadata associated with a data block in which data requested by a client is not present within the cache.

At block 620, pointers to cached metadata objects are flushed to special objects persisted within the object storage service to facilitate cache re-warming on reboot of the virtual storage system. In one embodiment, these are well known (or specially named) objects which store references to metadata objects or objects with metadata blocks. In one example, on a cold cache restart, these well-known objects may be used to inform the virtual storage system about metadata objects and allow pre-fetch reads to be issued for the metadata objects.

At block 630, after completion of a read (e.g., a GET) from the object storage service following a cache read miss for file system metadata within the cache, the metadata retrieved from the object storage is inserted within the cache.

At block 640, a cache insert of the new or updated metadata is performed. According to one embodiment, a CP performed for an aggregate (e.g., aggregate 210) may create new file system metadata or update existing file system metadata. In the case of newly created metadata not already existing within the cache, the new metadata is added to the cache. In the case of an update made to existing file system metadata present within the cache, such metadata is updated.

In some embodiments, because data stored on non-persistent storage, such as ephemeral storage, is generally lost when a compute instance (e.g., compute instance 115) with which it is associated is stopped or terminated, an agreement may be made between the vendor of the virtual storage system and the hyperscaler that should the compute instance within which the virtual system is hosted go down due to an underlying recoverable host error, the hyperscaler will bring up a new compute instance (and the virtual storage system) on the same physical host (e.g., host 110). In which case, the contents of the external cache remains present and is immediately available within local ephemeral storage upon restart. Should the hyperscaler be unable to accommodate such an agreement or in the event the container instance within which the virtual storage system was running prior to shutdown is rehosted (i.e., brought up on a different physical host, for example, as a result of an unrecoverable host error), in such circumstances, the external cache may be re-warmed by reloading file system metadata that resided within the external cache just prior to the shutdown or reboot.

At decision block 650, it is determined whether the virtual storage system has been rehosted. If so, processing continues with block 680; otherwise, processing loops back to decision block 610 as the virtual storage system has been brought up on the same host and as a result the cache remains present within the ephemeral storage associated with the host. According to one embodiment, the determination regarding whether the virtual storage system has been rehosted may make use of a previously stored unique identifier (ID) (e.g., a serial number) of the ephemeral storage, for example, persisted to a set of boot arguments stored on the boot media (or within object storage) to facilitate communication of state information across graceful redeployment on the same host, rehosting on a new host, and from boot to boot. For example, the virtual storage system may compare the unique ID of the current ephemeral storage to that which was stored previously. If the unique IDs match, the virtual storage system has not been rehosted; otherwise, the virtual storage system has been rehosted.

At block 660, the cache is re-warmed based on the special objects (e.g., those containing pointers to cached metadata objects and flushed in block 620 prior to the imminent shutdown or reboot).

By using the proposed read performance acceleration approaches described herein for a virtual storage system (e.g., a distributed storage system in the form of a cluster of two or more of virtual storage systems 120*a-n*) deployed on object storage, the overall cost of operating the virtual storage system may be reduced as compared to a comparable virtual storage system that makes use of cloud volumes as the primary storage tier. Combining the cost reductions with the read path latency improvements over a comparable virtual storage system without the proposed external cache for maintaining file system metadata, those skilled in the art will appreciate a virtual storage system deployment making use of object storage as the primary storage tier is likely to be a suitable and cost-effective platform for a number of types of cloud workloads.

Example Approach for Performing Analytics Involving Cold Data

As noted above, tiering solutions (e.g., NetApp Cloud Tiering intelligent data tiering service) are available, for example, that help reduce storage costs by tiering cold data from physical on-premises storage systems (e.g., physical storage system 130) to object storage (e.g., object storage service 140). However, after such cold data has been tiered to object storage, it is not independently accessible by other means from the cloud (e.g., hyperscaler 160). As a result, to the extent some data processing activity (e.g., analytics) involving the entire dataset (both the hot data retained locally by the physical storage system and the cold data, now residing within object storage in the cloud), the cold data generally needs to be reloaded back into the physical storage system. Given a typical ratio of cold to hot data of on the order of 80:20, such data transfer/movement could take a significant amount of time. Such data movement might even be impractical in many situations due to storage capacity limitations of the physical storage system which might not be able to accommodate the entire dataset.

A novel approach is proposed herein to essentially create a virtual clone of the physical storage system where the majority of the dataset resides. For example, as described further below with reference to FIG. 1B and FIG. 7, in one example, one or more virtual storage systems (e.g., virtual storage systems 120*a-n*) may be instantiated in the cloud (e.g., hyperscaler 160) to facilitate efficient access to data previously tiered out to an object store (e.g., object storage service 150) of the cloud by a physical storage system 130, for example, deployed in an on-premises environment (not shown). Assuming, for example, the ratio of cold to hot data is 80:20, if may be more efficient for purposes of performing analytics and the like on the entire data set to move hot data (e.g., including data in active use or recently created and file system metadata) from the physical storage system 130 to a virtual storage system (e.g., virtual storage system 120*a*) than to move the cold data tiered to object storage (e.g., object storage service 140) back to the physical storage system 130. Meanwhile, it may be impractical to do so, for example, given storage space limitations of the physical storage system 130. According to one embodiment, the hot data maintained within the physical storage system can be copied to object storage so as to have the entire dataset in object storage. Then, an instance of a virtual storage system (e.g., including one or more of virtual storage systems 120*a-n*) may be deployed on the object storage (as described above) in the hyperscaler hosting the object storage. Next, configuration information or parameters relating to the physical storage system may be transferred to the virtual storage system. At this point, the entire dataset is locally accessible by the virtual storage system via the object store and may be used, for example, to perform analytics. In one embodiment, the virtual storage system may implement one or more of the proposed read performance acceleration approaches described herein. An example of performing analytics involving cold data that has previously been tiered to object storage from a physical storage system is described further below with reference to FIG. 7.

Figure 1B:
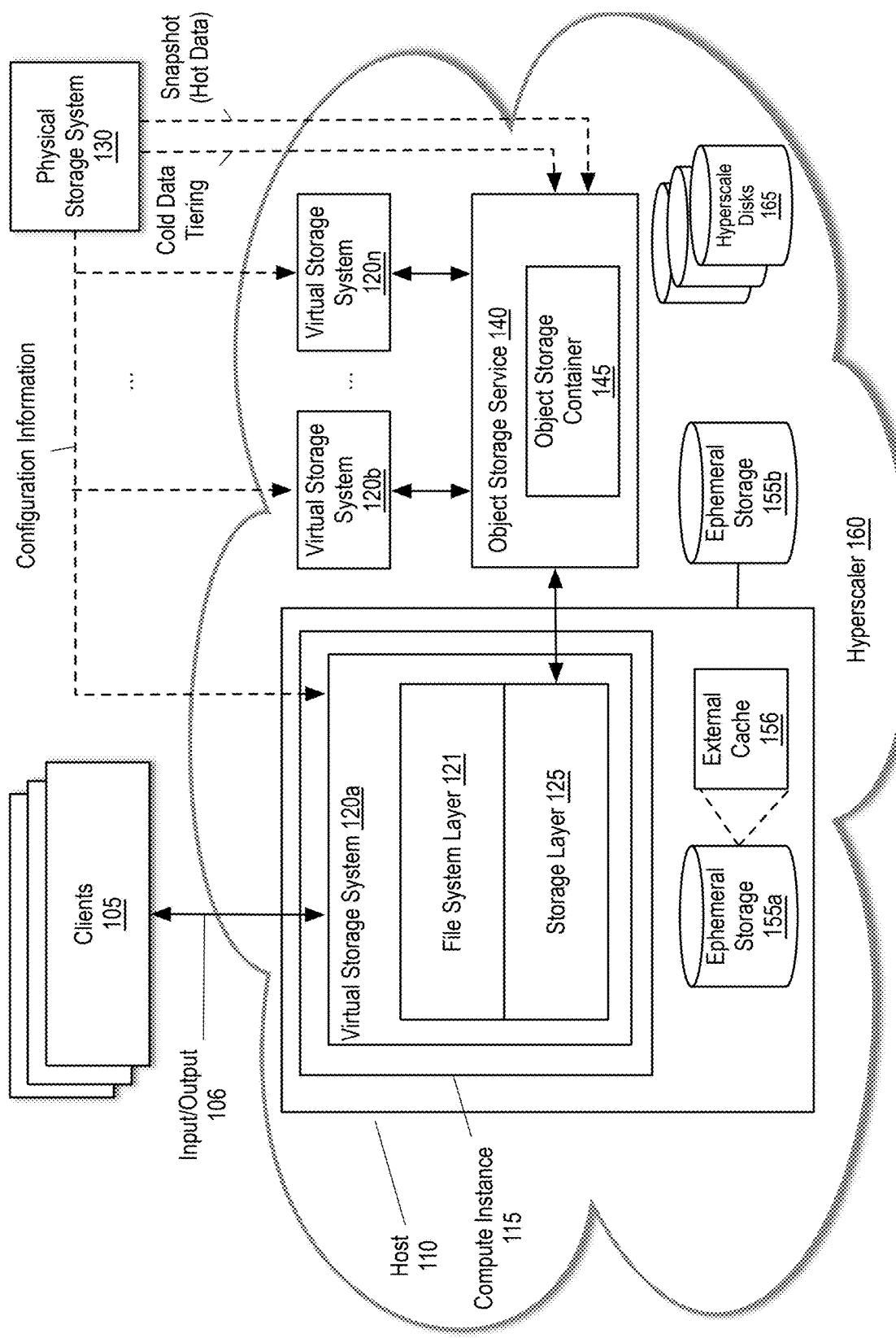
FIG. 1B is a block diagram illustrating the environment of FIG. 1A in which the one or more virtual storage systems may represent virtual clones of a physical storage system in accordance with an embodiment of the present disclosure.
Figure 7:
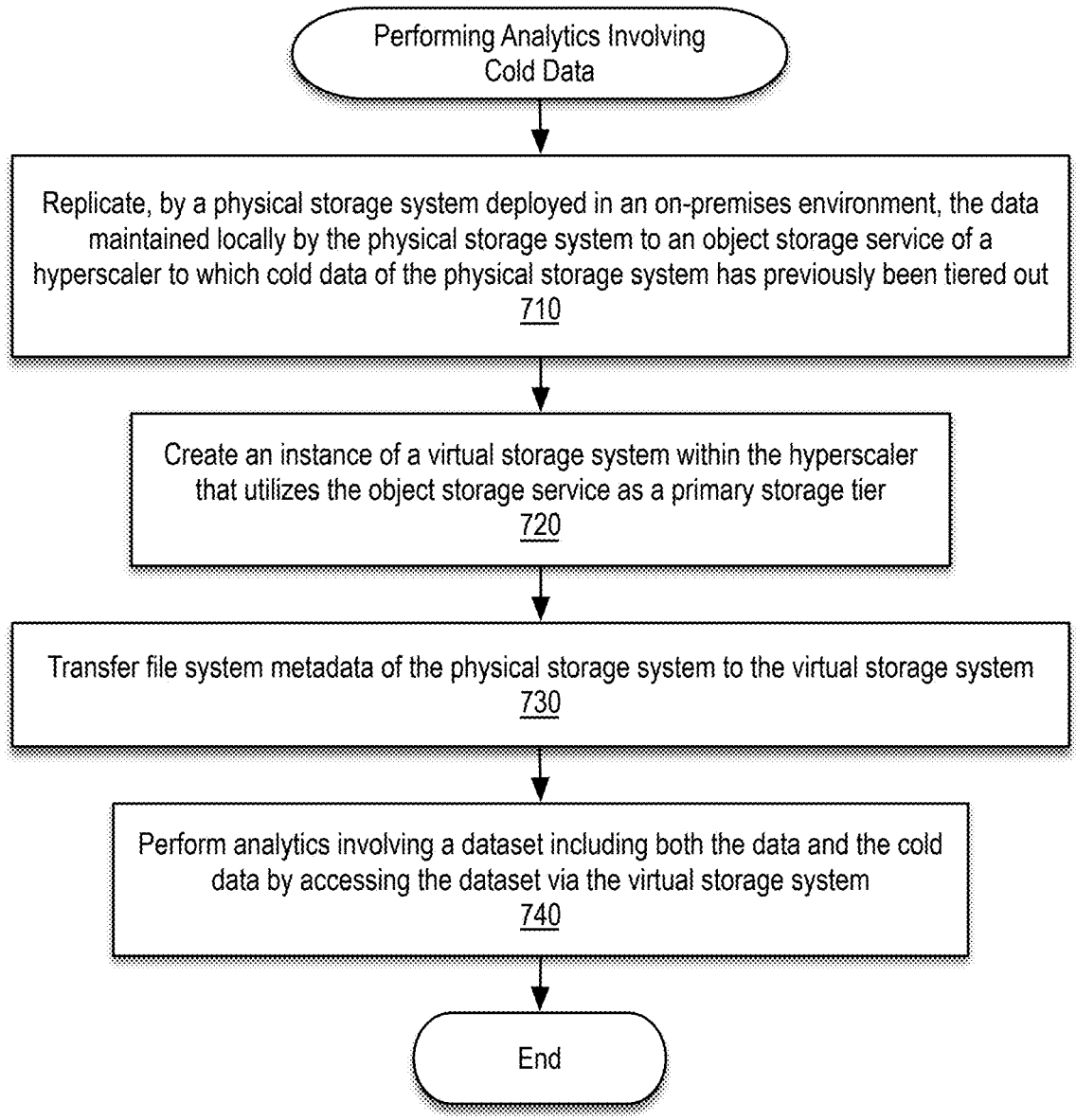
FIG. 7 is a flow diagram illustrating operations for performing analytics involving cold data in accordance with an embodiment of the present disclosure.

FIG. 7 is a flow diagram illustrating operations for performing analytics involving cold data in accordance with an embodiment of the present disclosure. In the context of the present example, it is assumed, during the course of operation, a physical storage system (e.g., physical storage system 130) deployed in an on-premises environment has previously tiered some portion (e.g., cold data) of the entire dataset of the file system to an object store (e.g., object storage service 140) of a hyperscaler (e.g., hyperscaler 160) as shown in FIG. 1B. It is further assumed there is a need to perform analytics of some kind involving the entire dataset (including both the cold data that now resides remotely from the physical storage system within the object store and the hot data that remains local to the physical storage system, for example, on a disk array associated with the physical storage system).

At block 710, rather than attempting to reload the cold data back into the physical storage system which may be impractical due to storage capacity limitations, the physical storage system replicates the hot data maintained locally (e.g., on a set of one or more disks associated with the physical storage system) by its file system to the object store. For example, as shown in FIG. 1B, a point-in-time snapshot may be taken of the data locally maintained (the hot data) by the physical storage system and transferred to the object store to be allow the hot data to be persisted within the object store as objects. The hot data includes file system metadata plus any data that is in active use or data that has been created recently. As part of the ingestion into the object store, the PVBNs (pointing to blocks of storage on disk) of the on-premises physical storage system are translated to PVBNs inside objects of the object storage, for example, based on the mapping described above with reference to FIG. 2. At this point, a copy of the entire data set (both hot and cold data) is now contained within the object store.

At block 720, an instance of a virtual storage systems (e.g., one of virtual storage systems 120*a-n*) is created within the hyperscaler that utilizes the object storage service as its respective primary storage tier. For example, the virtual storage system may implement one or more of the various examples of block number space to object mapping, the PVBN format, the mappings between object IDs and associated bitmaps as described herein as well as the proposed read path acceleration approaches.

At block 730, configuration information relating to the configuration of the file system of the physical storage system may be transferred to the virtual storage system. The configuration information may include configuration parameters to setup the virtual storage system to make it look like a tiering solution deployment in which the cold tier of the virtual storage system points to the object storage that served as the cold tier for the on-premises physical storage system. In effect, the setup of the virtual storage system starts to look like the on-premises physical storage system setup, which has tiered some data to object storage. Effectively, the virtual storage system may be considered a virtual clone of the physical storage system, but in the case of the virtual storage system the compute instance and hot and cold tiers are all in the cloud. Both storage systems now have access to the same dataset but the file system of the physical storage system is making use of (pointing to) on-premises storage (e.g., a set of one or more disks) associated with the physical storage system as its primary storage tier while the virtual storage system is making use of the object store as its primary storage tier.

At block 740, analytics may now be performed involving the entire dataset (both hot and cold data) by accessing the dataset via the virtual storage system. As those skilled in the art will appreciate there are various types of analytics that might be performed, including, for example, artificial-intelligence (AI)-powered data analytics, on big data sets.

In this manner, potential impracticalities due to storage capacity limitations of the physical storage system may be overcome and time efficiencies may be achieved by transferring less data. Additionally, given the compute-intensive nature of performing certain analytics, the use of such a virtual clone can be thought of as a mechanism for making the physical storage system operate more efficiently by offloading such compute-intensive processing to the cloud, thereby avoiding impacting the core storage performance provided by the physical storage system as it potentially continues to operate in parallel and serve clients 105.

While in the context of the present example, a single virtual clone is described as performing analytics based on having access to an entire dataset of a physical storage system in which cold data of the dataset was previously tiered to an object store, it is to be appreciated given the multi-attach capabilities of object stores, in some examples, multiple read-only virtual clones (e.g., instances of virtual storage systems 120*a-n*) could be created and run in parallel to perform various types of analytics, potentially on behalf of different stakeholders (e.g., within the customer organization and/or part of the vendor's customer support team) seeking to extract different insights from the dataset. For example, one stakeholder may be looking for ways to improve predictive analysis, whereas another stakeholder may be pursuing opportunities to improve customer service.

While in the context of the present example, analytics are described as being performed by a virtual clone of a physical storage system, it is further to be appreciated in other examples, other types of data services could also be performed by the virtual clone. The category of data services is quite broad. Data services can help with the aggregation of data from various parts of a storage architecture, or in the creation of a central data center repository. Data services may deal with data in transit, or with storage. Data services may refer to various categories of software that facilitate access to data, and/or analysis of data. Non-limiting examples of data services include small, independent, and loosely coupled functions that enhance, organize, share, or calculate information collected and saved in data storage volumes. Data services may amplify traditional data by improving its resiliency, availability, and validity, as well as adding characteristics to data that it doesn't already have natively-like metadata. Non-limiting examples of data services include, but are not limited to performance of file system analytics and cataloging of user data assets.

Example Computer System

Embodiments of the present disclosure include various steps, which have been described above. The steps may be performed by hardware components or may be embodied in machine-executable instructions, which may be used to cause one or more processing resources (e.g., one or more general-purpose or special-purpose processors) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 8:
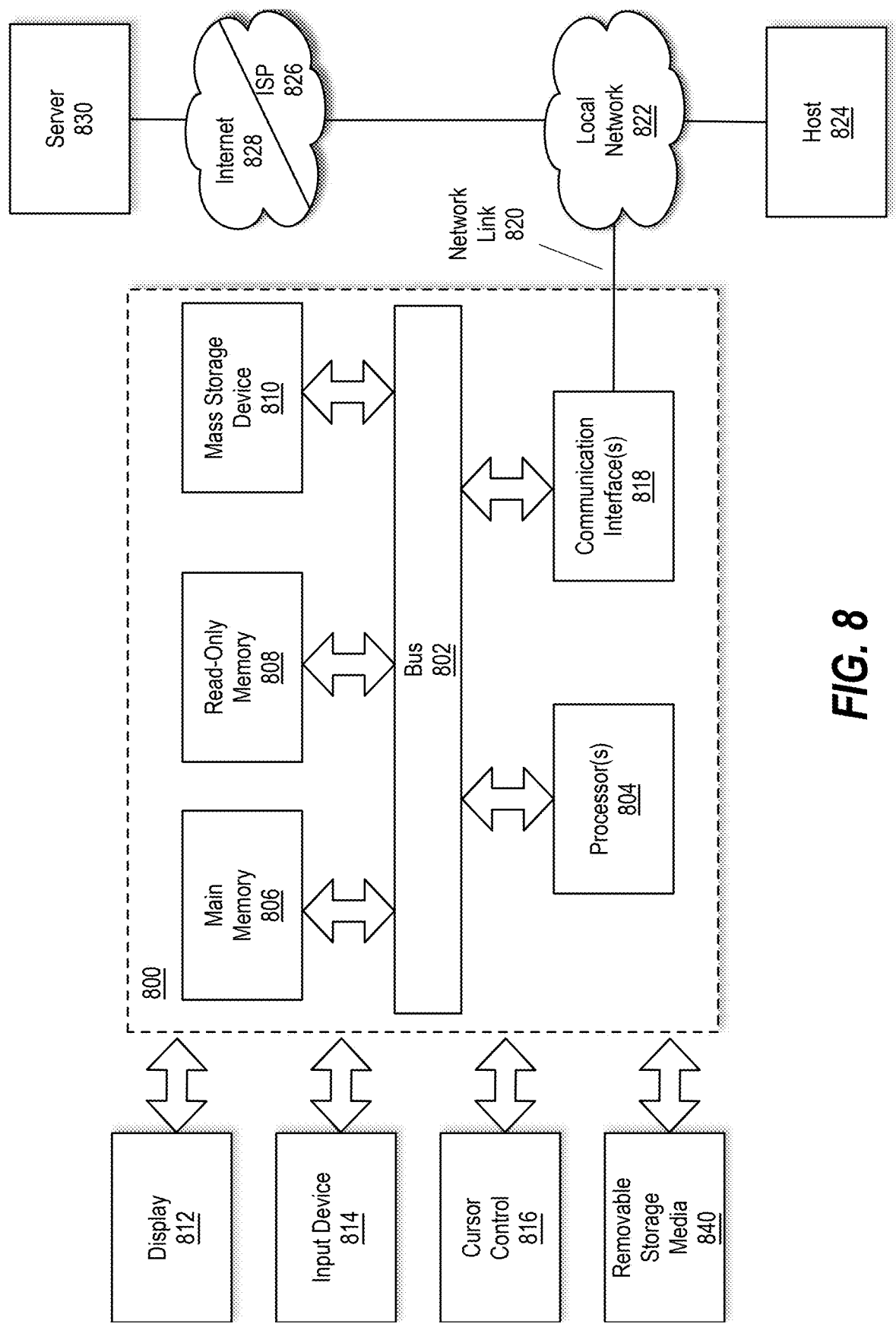
FIG. 8 illustrates an example computer system in which or with which embodiments of the present disclosure may be utilized.

FIG. 8 is a block diagram that illustrates a computer system 800 in which or with which an embodiment of the present disclosure may be implemented. Computer system 800 may be representative of all or a portion of the computing resources of a physical host (e.g., host 110) on which a virtual storage system (e.g., one of virtual storage systems 120a-n) of a distributed storage system is deployed or a physical storage system (e.g., physical storage system 130). Notably, components of computer system 800 described herein are meant only to exemplify various possibilities. In no way should example computer system 800 limit the scope of the present disclosure. In the context of the present example, computer system 800 includes a bus 802 or other communication mechanism for communicating information, and one or more processing resources (e.g., one or more hardware processors 804) coupled with bus 802 for processing information. Hardware processor(s) 804 may be, for example, a general purpose microprocessor.

Computer system 800 also includes a main memory 806, such as a random access memory (RAM) or other dynamic storage device, coupled to bus 802 for storing information and instructions to be executed by processor(s) 804. Main memory 806 also may be used for storing temporary variables or other intermediate information during execution of instructions to be executed by processor(s) 804. Such instructions, when stored in non-transitory storage media accessible to processor(s) 804, render computer system 800 into a special-purpose machine that is customized to perform the operations specified in the instructions.

Computer system 800 further includes a read only memory (ROM) 808 or other static storage device coupled to bus 802 for storing static information and instructions for processor(s) 804. A storage device 810, e.g., a magnetic disk, optical disk or flash disk (made of flash memory chips), is provided and coupled to bus 802 for storing information and instructions.

Computer system 800 may be coupled via bus 802 to a display 812, e.g., a cathode ray tube (CRT), Liquid Crystal Display (LCD), Organic Light-Emitting Diode Display (OLED), Digital Light Processing Display (DLP) or the like, for displaying information to a computer user. An input device 814, including alphanumeric and other keys, is coupled to bus 802 for communicating information and command selections to processor(s) 804. Another type of user input device is cursor control 816, such as a mouse, a trackball, a trackpad, or cursor direction keys for communicating direction information and command selections to processor(s) 804 and for controlling cursor movement on display 812. This input device typically has two degrees of freedom in two axes, a first axis (e.g., x) and a second axis (e.g., y), that allows the device to specify positions in a plane.

Removable storage media 840 can be any kind of external storage media, including, but not limited to, hard-drives, floppy drives, IOMEGA® Zip Drives, Compact Disc Read Only Memory (CD-ROM), Compact Disc-Re-Writable (CD-RW), Digital Video Disk Read Only Memory (DVD-ROM), USB flash drives and the like.

Computer system 800 may implement the techniques described herein using customized hard-wired logic, one or more ASICs or FPGAs, firmware or program logic which in combination with the computer system causes or programs computer system 800 to be a special-purpose machine. According to one embodiment, the techniques herein are performed by computer system 800 in response to processor (s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 810. Volatile media includes dynamic memory, such as main memory 806. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor (s) 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor(s) 804 retrieve and execute the instructions. The instructions received by main memory 806 may optionally be stored on storage device 810 either before or after execution by processor(s) 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. The received code may be executed by processor(s) 804 as it is received, or stored in storage device 810, or other non-volatile storage for later execution.

All examples and illustrative references are non-limiting and should not be used to limit the applicability of the proposed approach to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   replicating, by a physical storage system deployed in an on-premises environment, hot data of a first file system of the physical storage system stored on a plurality of disks associated with the physical storage system to an object storage service of a hyperscaler to which cold data of the first file system has previously been tiered out;
   creating an instance of a virtual storage system within the hyperscaler that utilizes the object storage service as a primary storage tier;
   performing analytics involving a dataset including both the hot data and the cold data by accessing the dataset via the virtual storage system; and
   accelerating read performance of a second file system of the virtual storage system by maintaining, within ephemeral storage associated with a host on which the virtual storage system is deployed, a cache containing metadata of the second file system, wherein the metadata is associated with data previously read by a client of the virtual storage system.

2. The method of claim 1, wherein said replicating includes taking a point-in-time snapshot of the hot data.

3. The method of claim 1, wherein the hot data includes metadata of the first file system and one or both of (i) any data that is in active use by the first file system and (ii) data that has been created recently within the first file system.

4. The method of claim 3, wherein the metadata includes one or more of information regarding one or more container files in which the hot data is stored, information indicating which physical volume block numbers (PVBNs) of an aggregate of the first file system are in use, and information regarding a hierarchical set of index node (inode) data structures representing a state of the first file system.

5. The method of claim 1, further comprising causing a cold tier of the virtual storage system to point to the object storage service that served as a cold tier for physical storage system.

6. The method of claim 1, further comprising prior to persisting the hot data within the object storage service, translating physical volume block numbers (PVBNs) of data blocks of an aggregate of the first file system within which the hot data is stored into PVBNs within objects to be stored to the object storage service.

7. The method of claim 1, wherein said maintaining includes:
   inserting a first new block of metadata into the cache after the first new block of metadata has been created by the second file system;
   inserting a second new block of metadata into the cache after the second new block of metadata is read from object storage as part of a read of client data; and
   updating an existing block of metadata after the existing block of the metadata has been overwritten by the second file system.

8. The method of claim 1, further comprising maintaining within the cache a working set of a workload of the client.

9. The method of claim 1, wherein the first file system and the second file system comprise a write-anywhere file system.

10. A system comprising:
    one or more processing resource; and
    instructions that when executed by the one or more processing resources cause a method to be performed comprising:
    replicating, by a physical storage system deployed in an on-premises environment, hot data of a first file system of the physical storage system stored on a plurality of disks associated with the physical storage system to an object storage service of a hyperscaler to which cold data of the first file system has previously been tiered out;
    creating an instance of a virtual storage system within the hyperscaler that utilizes the object storage service as a primary storage tier;
    performing analytics involving a dataset including both the hot data and the cold data by accessing the dataset via the virtual storage system; and
    accelerating read performance of a second file system of the virtual storage system by maintaining, within ephemeral storage associated with a host on which the virtual storage system is deployed, a cache containing metadata of the second file system, wherein the metadata is associated with data previously read by a client of the virtual storage system.

11. The system of claim 10, wherein said replicating includes taking a point-in-time snapshot of the hot data.

12. The system of claim 10, wherein the hot data includes metadata of the first file system and one or both of (i) any data that is in active use by the first file system of the physical storage system and (ii) data that has been created recently within the first file system.

13. The system of claim 12, wherein the metadata includes one or more of information regarding one or more container files in which the hot data is stored, information indicating which physical volume block numbers (PVBNs) of an aggregate of the first file system are in use, and information regarding a hierarchical set of index node (inode) data structures representing a state of the first file system.

14. The system of claim 10, wherein the method further comprises causing a cold tier of the virtual storage system to point to the object storage service that served as a cold tier for physical storage system.

15. The system of claim 10, wherein the method further comprises, prior to persisting the hot data within the object storage service, translating physical volume block numbers (PVBNs) of data blocks of an aggregate of the first file system within which the hot data is stored into PVBNs within objects to be stored to the object storage service.

16. The system of claim 10, wherein said maintaining includes:
   inserting a first new block of metadata into the cache after the first new block of metadata has been created by the second file system;
   inserting a second new block of metadata into the cache after the second new block of metadata is read from object storage as part of a read of client data; and
   updating an existing block of metadata after the existing block of the metadata has been overwritten by the second file system.

17. The system of claim 10, wherein the method further comprises maintaining within the cache a working set of a workload of the client.

18. The system of claim 10, wherein the file system of the physical storage system and the file system of the virtual storage system each comprise a write-anywhere file system.

19. A non-transitory machine readable medium storing instructions, which when executed by one or more processing resources of a system including at least (i) a physical storage system deployed in an on-premises environment and (ii) a virtual storage system deployed within a hyperscaler, cause the system to:
   replicate, by the physical storage system, hot data of a first file system stored on a plurality of disks associated with the physical storage system to an object storage service of a hyperscaler to which cold data of the first file system has previously been tiered out;
   create an instance of a virtual storage system within the hyperscaler that utilizes the object storage service as a primary storage tier;
   perform analytics involving a dataset including both the hot data and the cold data by accessing the dataset via the virtual storage system; and
   accelerate read performance of a second file system of the virtual storage system by maintaining, within ephemeral storage associated with a host on which the virtual storage system is deployed, a cache containing metadata of the second file system, wherein the metadata is associated with data previously read by a client of the virtual storage system.

20. The non-transitory machine readable medium of claim 19, wherein:
   the hot data includes metadata of the file system and one or both of (i) any data that is in active use by the first file system and (ii) data that has been created recently within the first file system; and
   the metadata includes one or more of information regarding one or more container files in which the hot data is stored, information indicating which physical volume block numbers (PVBNs) of an aggregate of the first file system are in use, and information regarding a hierarchical set of index node (inode) data structures representing a state of the first file system.

* * * * *